(12) United States Patent　(10) Patent No.: US 7,873,987 B2
Kitazato et al.　(45) Date of Patent: Jan. 18, 2011

(54) CONTENT DISTRIBUTION SYSTEM AND DISTRIBUTION METHOD, AND CONTENT PROCESSING DEVICE AND PROCESSING METHOD

(75) Inventors: Naohisa Kitazato, Tokyo (JP); Yoshiharu Dewa, Tokyo (JP); Yasushi Katayama, Tokyo (JP); Tatsuya Shimoji, Osaka (JP); Hideki Kagemoto, Nara (JP); Katsumi Tokuda, Osaka (JP); Hiroki Murakami, Osaka (JP)

(73) Assignees: Sony Corporation, Tokyo (JP); Panasonic Corporation, Osaka (JP)

( * ) Notice: Subject to any disclaimer, the term of this patent is extended or adjusted under 35 U.S.C. 154(b) by 259 days.

(21) Appl. No.: 10/548,455

(22) PCT Filed: Dec. 6, 2004

(86) PCT No.: PCT/JP2004/018161

§ 371 (c)(1),
(2), (4) Date: Sep. 12, 2005

(87) PCT Pub. No.: WO2005/060257

PCT Pub. Date: Jun. 30, 2005

(65) Prior Publication Data

US 2006/0212943 A1　Sep. 21, 2006

(30) Foreign Application Priority Data

Dec. 5, 2003　(JP) ............................ P2003-407455

(51) Int. Cl.
*G06F 12/14*　(2006.01)
*G06F 7/04*　(2006.01)
*H04L 9/08*　(2006.01)
*H04N 7/16*　(2006.01)

(52) U.S. Cl. ............................... 726/4; 726/17; 726/27; 726/28; 726/29; 726/30; 380/279

(58) Field of Classification Search .................... 726/4; 380/279
See application file for complete search history.

(56) References Cited

U.S. PATENT DOCUMENTS 4,712,238 A * 12/1987 Gilhousen et al. ........... 380/232

(Continued)

FOREIGN PATENT DOCUMENTS

EP　0 164 983 A2　12/1985

(Continued)

OTHER PUBLICATIONS

Computer translation of JP 2000207309 A.*

(Continued)

*Primary Examiner*—Kaveh Abrishamkar
(74) *Attorney, Agent, or Firm*—Finnegan, Henderson, Farabow, Garrett & Dunner, L.L.P.

(57) ABSTRACT

In a content delivery system including a server and content processing apparatus connected to each other across a network, a content delivered by the system is encrypted with a content key Kc, and supplied along with a sublicense encrypted with a work key Kw to a DTV. The sublicense includes a second use condition under which a content is used and a content key Kc for decrypting an encrypted content. The work key Kw for decrypting an encrypted content is included in a main license. The main license is supplied to the DTV separately from the content. The main license includes, in addition to the work key Kw, a first use condition under which a content under a subscription contract is used.

17 Claims, 10 Drawing Sheets

U.S. PATENT DOCUMENTS

| | | | |
|---|---|---|---|
| 7,313,814 B2 * | 12/2007 | Zhu et al. | 726/6 |
| 7,359,883 B2 * | 4/2008 | Namba et al. | 705/59 |
| 2003/0204723 A1 | 10/2003 | Narin et al. | |

FOREIGN PATENT DOCUMENTS

| | | | |
|---|---|---|---|
| EP | 0 164 983 A3 | | 12/1985 |
| JP | 2000270309 A | * | 9/2000 |
| JP | 2002-109255 | | 4/2002 |
| JP | 2002-288376 | | 10/2002 |
| JP | 2003-131751 | | 5/2003 |
| JP | 2003-187101 | | 7/2003 |
| JP | 2003-209827 | | 7/2003 |
| WO | WO 02/080446 | | 10/2002 |

OTHER PUBLICATIONS

European Patent Office Supplemental Search Report in Application No. 04820519.9-1241, dated Aug. 19, 2010 (3 pages).

* cited by examiner

| Composition | | | | Size |
|---|---|---|---|---|
| ECM section | ECM body | Header | ECM section header (table ID + 0 ( 82) | 8 Bytes |
| | | | Protocol No. | 1 Byte |
| | | | Business entity identification | 1 Byte |
| | | | Work key identification | 1 Byte |
| | | | Content ID | 16 Bytes |
| | | | Odd/even of content being listened to and viewed | 1 Byte |
| | | | No. of sublicenses (current program) | 4 Bytes |
| | | | 1 License ID | 16 Bytes |
| | | | Type | 1 Byte |
| | | | Location | 2 Bytes |
| | | | ⁓ | |
| | | | n License ID | 16 Bytes |
| | | | Type | 1 Byte |
| | | | Location | 2 Bytes |
| | | | No. of sublicenses (next program) | 4 Bytes |
| | | | 1 License ID | 16 Bytes |
| | | | Type | 1 Byte |
| | | | Location | 2 Bytes |
| | | | ⁓ | |
| | | | n License ID | 16 Bytes |
| | | | Type | 1 Byte |
| | | | Location | 2 Bytes |
| | | License section | License × No. of sublicenses | Variable length |
| | | | Section CRC | 4 Bytes |

FIG.9

CONTENT DISTRIBUTION SYSTEM AND DISTRIBUTION METHOD, AND CONTENT PROCESSING DEVICE AND PROCESSING METHOD

TECHNICAL FIELD

The present invention generally relates to a content delivery system and method and a content processing apparatus and method, and more particularly to a content delivery system and method, content processing apparatus and method, content supplying apparatus and method, a program for use to operate these systems and apparatuses and a recording medium having the program recorded therein.

This application claims the priority of the Japanese Patent Application No. 2003-407455 filed on Dec. 5, 2003, the entirety of which is incorporated by reference herein.

BACKGROUND ART

The Internet infrastructure has heretofore been upgraded, and there have been implemented businesses for delivering various contents such as audio data, audio/visual (AV) data, program data, etc. over the Internet.

The types of contract for content delivery over the Internet include a "pay-per-content" contract and "subscription" contract.

Under the "pay-per-content" contract, a specified content or a specified group of contents is sold or bought. Under the "subscription contract", a right to use a plurality of unspecified contents is sold and bought as is under a monthly contract for a pay channel of television broadcast, for example.

Under any of the pay-per-content and subscription contracts, a content is delivered in an encrypted form and a license including a key for decryption of the encrypted form is also delivered along with the encrypted content.

For example, the Japanese Patent Application Laid Open No. 2002-116856 discloses a method of delivering a license for an encrypted content separately from the encrypted content. Since the license delivery method disclosed in this Japanese Patent Application has to deliver a license for each content, it is suitable for the content delivery under the pay-per-content contract but not for the content delivery under the subscription contract.

A content delivery service under both the pay-per-content and subscription contracts is under development, but a method of delivering a license in that service has not yet been established.

DISCLOSURE OF THE INVENTION

Accordingly, the present invention has an object to overcome the above-mentioned drawbacks of the related art by providing a method of delivering a license in a service to be operated under both the payer-per-content and subscription contracts.

The above object can be attained by providing a content delivery system in which a server includes a first license supplying means for supplying a content processing apparatus with a first license necessary for processing a content in the content processing apparatus; a content supplying means for supplying the content processing apparatus with a series of data included in the content and which includes license identification information indicative of whether there exists a second license for processing the content, that is different from the first license; and a second license supplying means for supplying the content processing apparatus with a second license for processing the content, that is different from the first license, the content processing apparatus including a judging means for judging, based on the license identification information included in the series of data supplied from the server, whether there exists a second license for processing the content, that is different from the first license; a license acquiring means for acquiring the second license supplied from the server correspondingly to the result of judgment from the judging means; and a data reproducing means for reproducing content resource data included in the series of data supplied from the content supplying means under at least one of the first and second licenses correspondingly to the result of judgment from the judging means.

According to the present invention, the second license may be a sublicense in a two-step license.

Also the above object can be attained by providing a content delivery method including, according to the present invention a first license supplying step to be made in a server to supply a content processing apparatus with a first license necessary for processing a content in the content processing apparatus; a content supplying step to be made in the server to supply the content processing apparatus with a series of data included in the content and including license identification information indicative of whether there exists a second license for processing the content, that is different from the first license; a second license supplying step to be made in the server to supply a content processing apparatus with a second license for processing the content, that is different from the first license, a judging step to be made in the content processing apparatus to judge, based on the license identification information included in the series of data supplied from the server, whether there exists a second license for processing the content, that is different from the first license; a license acquiring step to be made in the content processing apparatus to acquire the second license supplied from the server correspondingly to the result of judgment from the judging step; and a data reproducing step to be made in the content processing apparatus to reproduce content resource data included in the series of data supplied from the content supplying step using at least one of the first and second licenses correspondingly to the result of judgment from the judging step.

Also the above object can be attained by providing a content processing apparatus including according to the present invention a first license acquiring means for acquiring a first license necessary for processing a content; a content acquiring means for acquiring a series of data included in the content; a judging means for judging, based on license identification information included in the series of data acquired by the content acquiring means, whether there exists a second license for processing the content, that is different from the first license; a second license acquiring means for acquiring the second license supplied from a server correspondingly to the result of judgment from the judging means; and a data reproducing means for reproducing content resource data included in the series of data supplied from the content acquiring means using at least one of the first and second licenses correspondingly to the result of judgment from the judging means.

According to the present invention, when the judging means has determined that there is a second license for processing a content, that is different from the first license, the second license acquiring means may be adapted to acquire a second license from the series of data supplied from the server, and the reproducing means be adapted to decrypt the encrypted second license on the basis of the first license and reproduce content resource data included in the series of data supplied by the content acquiring means on the basis of the decrypted second license.

Also the reproducing means may be adapted to reproduce content resource data included in the series of data acquired by the content acquiring means on the basis of the first license when the judging means has determined that there is not any second license for processing the content, that is different from the first license.

Also, the content acquiring means may be adapted to acquire first data included in a content correspondingly to a reproduction starting operation made by the user, acquire second data including license identification information on the basis of the first data, and acquire content resource data on the basis of the first data.

The content processing apparatus according to the present invention may further include a storage means for storing return-destination specifying information indicative of a destination specified by the server and to which the apparatus is to be connected after completion of content reproduction.

Also the above object can be attained by providing a content processing method including according to the present invention a first license acquiring step of acquiring a first license necessary for processing a content; a content acquiring step of acquiring a series of data included in the content; a judging step of judging, based on license identification information included in the series of data acquired in the content acquiring step, whether there exists a second license for processing the content, that is different from the first license; a second license acquiring step of acquiring the second license supplied from a server correspondingly to the result of judgment from the judging step; and a data reproducing step of reproducing content resource data included in the series of data acquired in the content acquiring step using at least one of the first and second licenses correspondingly to the result of judgment from the judging step.

Also the above object can be attained by providing a first recording medium having recorded therein a computer-readable program which is intended for use to supply a content to a content processing apparatus across a network, the program including according to the present invention a first license acquiring step of acquiring a first license necessary for processing a content; a content acquiring step of acquiring a series of data included in the content; a judging step of judging, based on license identification information included in the series of data acquired in the content acquiring step, whether there exists a second license for processing the content, that is different from the first license; a second license acquiring step of acquiring the second license supplied from a server correspondingly to the result of judgment from the judging step; and a data reproducing step of reproducing content resource data included in the series of data acquired in the content acquiring step using at least one of the first and second licenses correspondingly to the result of judgment from the judging step.

Also the above object can be attained by providing a first program for having a computer execute a processing including according to the present invention a first license acquiring step of acquiring a first license necessary for processing a content; a content acquiring step of acquiring a series of data included in the content; a judging step of judging, based on license identification information included in the series of data acquired in the content acquiring step, whether there exists a second license for processing the content, that is different from the first license; a second license acquiring step of acquiring the second license supplied from a server correspondingly to the result of judgment from the judging step; and a data reproducing step of reproducing content resource data included in the series of data acquired in the content acquiring step using at least one of the first and second licenses correspondingly to the result of judgment from the judging step.

Also the above object can be attained by providing a content supplying apparatus including according to the present invention a first license supplying means for supplying a content processing apparatus with a first license necessary for processing a content in the content processing apparatus; a content supplying means for supplying the content processing apparatus with a series of data included in the content and which includes license identification information indicative of whether there exists a second license for processing the content, that is different from the first license; and a second license supplying means for supplying the content processing apparatus with a second license for processing the content, that is different from the first license.

The content requiring the first and second licenses for processing by the content processing apparatus according to the present invention may be a content complying a subscription contract, and the content requiring the first license, but not the second license, may be a content complying to a pay-per-content contract.

Also the above object can be attained by providing a content supplying method including according to the present invention a first license supplying step of supplying a content processing apparatus with a first license necessary for processing a content in the content processing apparatus; a content supplying step of supplying the content processing apparatus with a series of data included in the content and which includes license identification information indicative of whether there exists a second license for processing the content, that is different from the first license; and a second license supplying step of supplying the content processing apparatus with a second license for processing the content, that is different from the first license.

Also the above object can be attained by providing a second recording medium having recorded therein a computer-readable program which is intended for use to process a content to be delivered from a server across a network, the program including according to the present invention a first license supplying step of supplying a content processing apparatus with a first license necessary for processing a content in the content processing apparatus; a content supplying step of supplying the content processing apparatus with a series of data included in the content and which includes license identification information indicative of whether there exists a second license for processing the content, that is different from the first license; and a second license supplying step of supplying the content processing apparatus with a second license for processing the content, that is different from the first license.

Also the above object can be attained by providing a second program including according to the present invention a first license supplying step of supplying a content processing apparatus with a first license necessary for processing a content in the content processing apparatus; a content supplying step of supplying the content processing apparatus with a series of data included in the content and which includes license identification information indicative of whether there exists a second license for processing the content, that is different from the first license; and a second license supplying step of supplying the content processing apparatus with a second license for processing the content, that is different from the first license.

In the above content delivery apparatuses and methods according to the present invention, the server supplies the content processing apparatus with a first license necessary for processing a content in the content processing apparatus, and the content processing apparatus is supplied with a series of data included in the content and which includes license identification information indicative of whether there exists a second license for processing the content, that is different from the first license. Further, the second license for processing the content, that is different from the first license is supplied to the content processing apparatus. Also, the content processing apparatus judges, based on license identification information included in the series of data supplied from the server, whether there exists the second license for processing the content, that is different from the first license, and calls for the second license supplied from the server. Then, the content processing apparatus reproduces the content resource data included in the supplied series of data under at least one of the first and second licenses.

In the above content processing apparatuses and methods and the programs, a first license necessary for processing a content is acquired, a series of data included in the content is acquired, and it is judged, based on license identification information included in the acquired series of data, whether there exists a second license for processing the content, that is different from the first license. The second license supplied from the server is acquired correspondingly to the result of judgment, and content resource data included in the acquired series of data is reproduced under at least one of the first and second licenses correspondingly to the result of judgment.

In the content supplying apparatuses and methods and the programs, the content processing apparatus is supplied with a first license necessary for processing a content in the content processing apparatus, and also supplied with a series of data included in the content and which includes license identification information indicative of whether there exists a second license for processing the content, that is different from the first license. Further, the content processing apparatus is supplied with the second license for processing the content, that is different from the first license.

According to the present invention, a method of delivering a license in a service to be provided under the payer-per-content content can be established.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 9 shows an example of the configuration of an ECM section of MPEG2-TS.

BEST MODE FOR CARRYING OUT THE INVENTION

Figure 1:
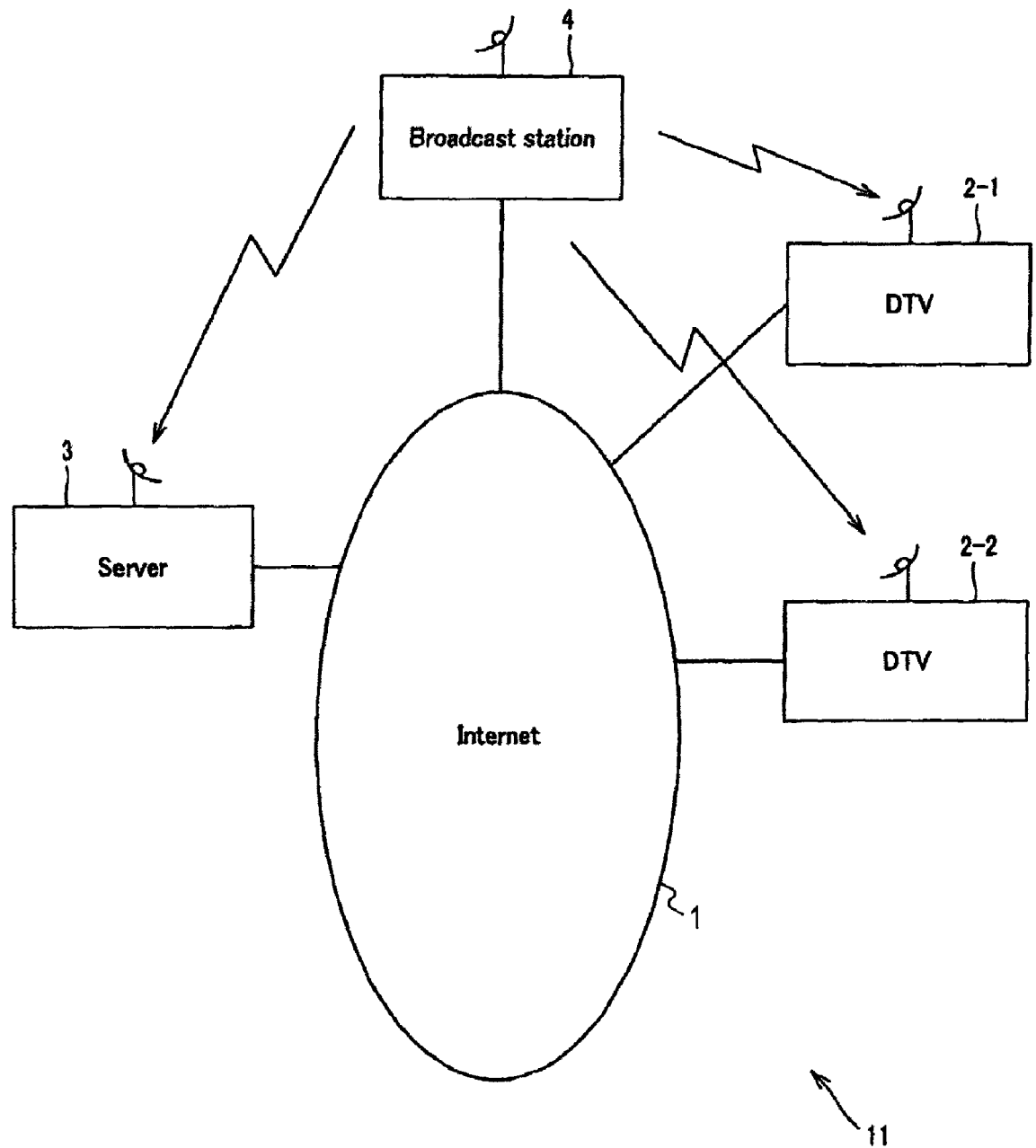
FIG. 1 is a block diagram of an example of the configuration of the content delivery system according to the present invention.

The present invention will be described in detail below concerning embodiments thereof with reference to the accompanying drawings. FIG. 1 shows an example of the configuration of the content delivery system according to the present invention. As shown, the content delivery system, generally indicated with a reference numeral 11, includes digital television (DTV) sets 2-1 and 2-2 and a server 3, connected to each other by the Internet 1 as a typical network.

A broadcast station 4 is also connected to the Internet 1. Each of the digital TV sets 2-1 and 2-2 is used in a home, workplace or the like, for example. It can receive TV broadcast wave from the broadcast station 4 for presenting a TV program, and also can reproduce a content received from the server 3 by downloading or streaming via the Internet 1. It should be noted that the streaming delivery methods referred to herein include multicasting and on-demand delivery methods.

The server 3 receives a program broadcast from the broadcast station 4 and holds AV data in the program as a content. Alternatively, the server 3 receives AV data included in the program from the broadcast station 4 across the Internet 1, and holds it as a content. Of course, the server 3 can also hold a content created uniquely or acquired from others.

Note that FIG. 1 shows only the two digital TV sets 2-1 and 2-2 and one server 3 but the actual content delivery system includes more than two digital TV sets 2-1 and 2-2 and a plurality of servers 3.

Also note that in the following description, the digital TV sets 2-1 and 2-2 will be referred to simply as "DTV 2" hereunder wherever they should not be referred to individually.

Figure 2:
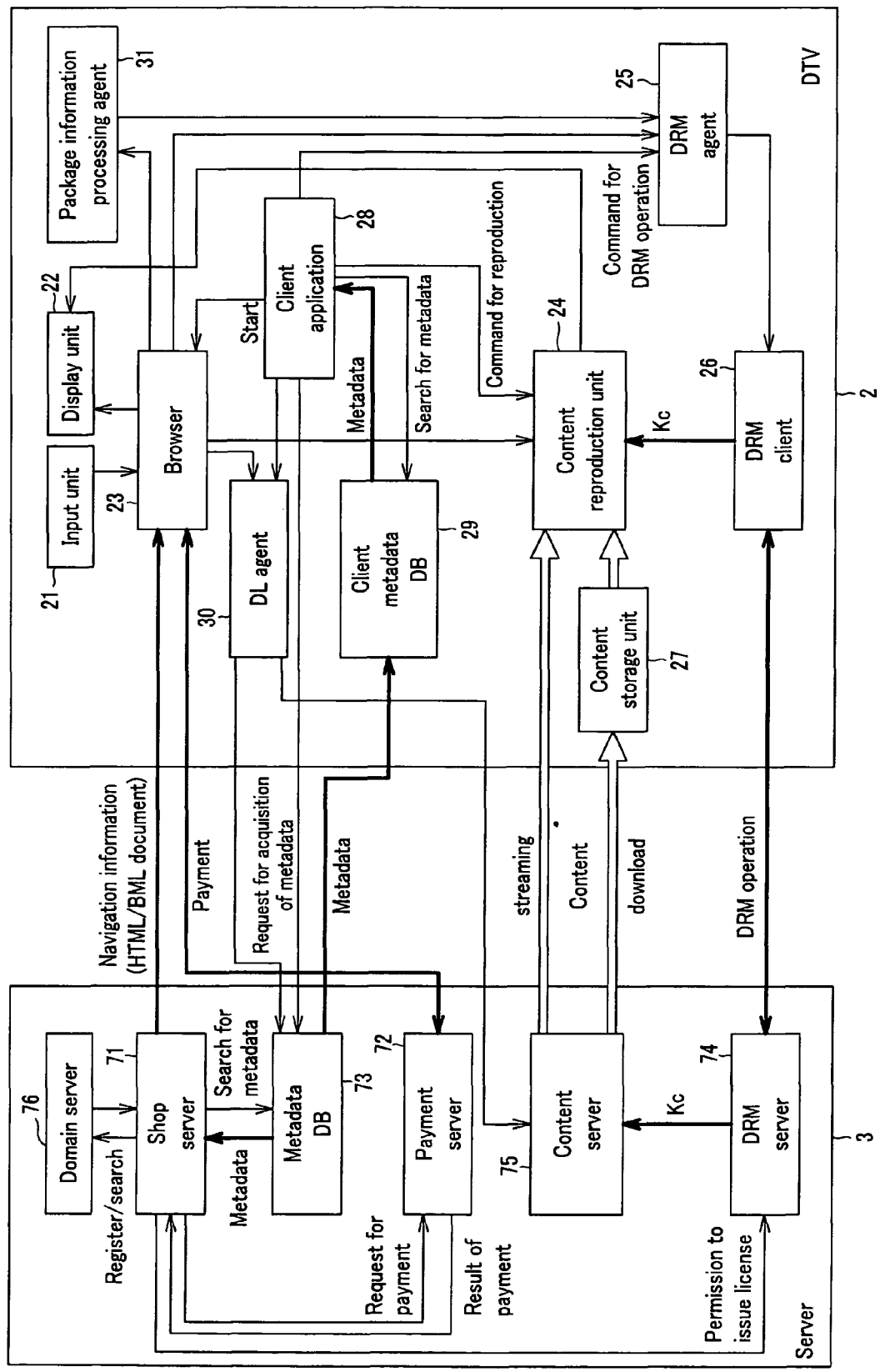
FIG. 2 is also a block diagram of an example of the configuration of the DTV and server shown in FIG. 1.

FIG. 2 shows an example of the configuration of the DTV 2 and server 3, respectively.

As shown, the DTV 2 includes an input unit 21, presentation unit 22, browser 23, content reproduction unit 24, DRM agent 25, DRM client 26, content storage unit 27, client application 28, client metadata data base (will be referred to as "client metadata DB" hereunder) 29, downloading (DL) agent 30, and a package information processing agent 31.

The input unit 21 is supplied with various commands from the user. The presentation unit 22 presents an image and sound resulted from reproduction of a content. Also, the presentation unit 22 provides, to the user, a screen for operating the browser 23 and other various kinds of information.

The browser 23 analyses navigation information including an HTML (hyper text markup language) document (including CSS (cascading style sheets)), supplied from a shop server 71 included in the server 3 for use to display a screen for acquisition of a content, presents it on the presentation unit 22, and executes a script included in the HTML. Similarly, the browser 23 analyses navigation information including a BML (broadcast markup language) document (including CSS), presents it on the presentation unit 22, and executes a script included in the BML. Also, the browser 23 can deal with XrML (extensible rights markup language; by the Content Guard). Also, the browser 23 communicates with a payment server 72 included in the server 3 to make a payment concerned with purchase of a content.

The content reproduction unit 24 operates in response to a reproduction command from the browser 23 or client application 28 to reproduce a content delivered, by streaming, from a content server 75 included in the server 3, and a content downloaded from the content server 75 and stored in the content storage unit 27.

The DRM agent 25 has the DRM client 26 make a DRM operation in response to a request from the browser 23 or client application 28. The DRM operations include acquisition of a license necessary for reproducing a content, authentication of whether the user is an appropriate user having the license, acquisition and granting of a key necessary for decryption of encrypted data, and other operation necessary for management of the license. The DRM agent 25 acquires a sublicense (will be described in detail later) included in a content and transfers it to the DRM client 26. The DRM client 26 is given an instruction from the DRM agent 25 to communicate with a DRM server 74 included in the server 3 for making a DRM operation.

The content storage unit 27 includes a hard disk or the like, for example, and stores a content acquired by normal downloading or push downloading from the content server 75 in the server 3.

The client application 28 includes various kinds of software, and provides the user with various function menus each as an user interface, and controls operations of the DTV 2. For example, the client application 28 starts up the browser 23, gives a reproduction command to the content reproduction unit 24, acquires metadata from a metadata DB 73 included in the server 3, searches metadata held in the client metadata DB 29 and makes other operations. The client metadata DB 29 holds metadata supplied from the metadata DB 73 in the server 3.

The downloading agent (will also be referred to as "DL agent" hereunder wherever appropriate) 30 downloads a content from the content server 75 in the server 3, and stores it in the content storage unit 27 according to an instruction supplied from the browser 23 or client application 28. Also, the downloading agent 30 acquires metadata on a downloaded content from the metadata DB 73, and has the client metadata DB 29 hold it.

The package information processing agent 31 requests the DRM agent 25 to acquire a license for a package which is a helper application for the browser 23 and also a unit in which a contents is sold.

As shown, the server 3 includes the shop server 71, payment server 72, metadata DB 73, DRM server 74, content server 75 and domain server 76.

When accessed by the browser 23 across the Internet 1, the shop server 71 provides the browser 23 with navigation information including HTML or BML documents.

The payment server 72 communicates with the browser 23 to make a payment. Also, the payment server 72 makes a payment on the basis of a payment request from the shop server 71, and reports the result of payment to the shop server 71.

In response to a request for acquisition of metadata from the client application 28, the metadata DB 73 reads pre-supplied and stored metadata, and supplies it to the client metadata DB 29 in the DTV 2. Also, the metadata DB 73 supplies the shop server 71 with metadata searched and acquired based on a request for search for metadata from the shop server 71.

Note that metadata include package metadata, license metadata, sublicense metadata, instance metadata, content metadata, etc. The package metadata is attribute information on a package which is a unit of buying a content, and it is used mainly as navigation information for buying a package. The license metadata is used mainly for presenting use condition in units of a license, and acquiring a license. The sublicense metadata is used mainly for presenting a use condition corresponding to a sublicense, and identifying a sublicense. The instance metadata is used for guidance to acquisition and reproduction of a content. The content metadata is attribute information on a content, and used for search for a content or for a similar purpose.

In response to a request for permission of license issue from the shop server 71, the DRM server 74 communicates with the DRM client 26 in the DTV 2, and makes a DRM operation. The DRM server 74 supplies the content server 75 with a content key Kc for encryption of a content. Also, when the DRM server 74 has successfully made the DRM operation, it supplies a corresponding license (will be described in detail later) to the DRM client 26 in the DTV 2.

The content server 75 holds a content to be supplied to the DTV 2, encrypts a content requested by the DTV 2 with the content key Kc supplied from the DRM server 74, delivers the content to the content reproduction unit 24 by streaming or to the content storage unit 27 as a downloading file for storage.

The domain server 76 issues a domain ID to the user of the DTV 2 in response to a registration request from the shop server 71, and manages it. Also, based on a request to search a domain ID from the shop server 71, the domain server 76 supplies the result of search to the shop server 71.

Note that in the example shown in FIG. 2, the server 3 includes the plurality of servers 3 but it may of course include only one server.

Next, a license for a content supplied from the server 3 to the DTV 2 across the Internet 1 will be explained. Depending upon which the type of the contract for content delivery is, pay-per-content contract or subscription contract, for example, either the one-step license or two-step license will be applied to the content delivery system 11.

Under the "pay-per-content contract (will be referred to as "PPC contract" hereunder)", a specified content (or a specified group of contents) is sold and bought per package. Under the "subscription contract", a right to use a plurality of unspecified contents is sold and bought as is under a monthly contract for a pay channel of television broadcast, for example.

The one-step licensing is applied to a content to be delivered under the PPC contract. On the other hand, the two-step licensing is applied to a content to be delivered under the subscription contract.

Figure 3:
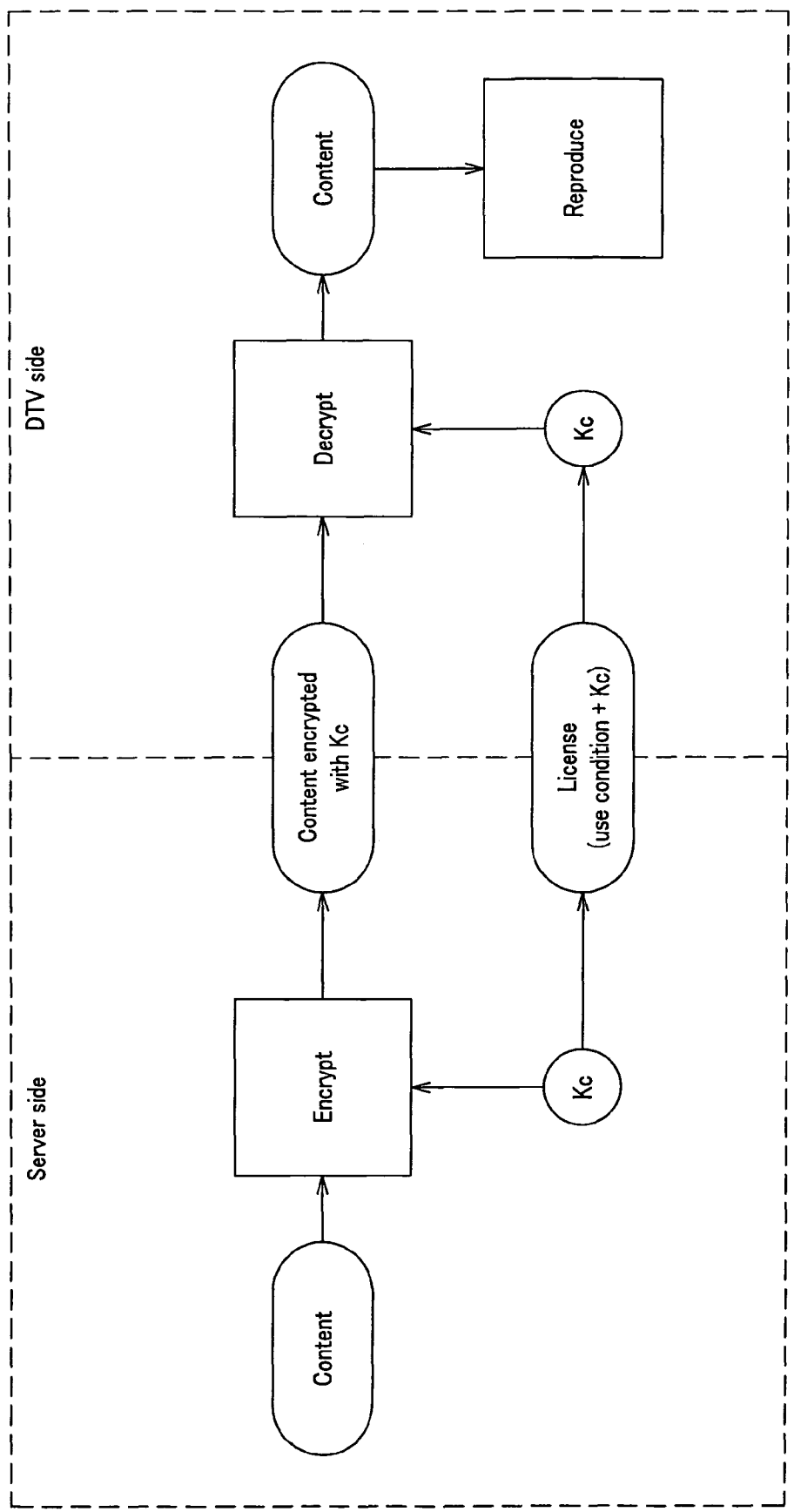
FIG. 3 schematically illustrates delivering a content and license when a one-step licensing is applied FIG. 4 schematically illustrates delivering a content and license when a two-step licensing is applied

FIG. 3 schematically illustrates the delivery of a content and a license in which the one-step licensing is applied to the content.

In the server 3, a content resource file (as in FIG. 5) as a main element of the content is encrypted with the content key Kc by the content server 75, and the encrypted content resource file is supplied to the DTV 2. The content key Kc is supplied as a license for a corresponding content along with the use condition for the corresponding content to the DTV 2 from the DRM server 74 separately from the encrypted content.

In the DTV 2, the encrypted content is decrypted for reproduction with the content key Kc included in the license. It should be noted that delivering a content and license in case the one-step licensing is applied will be described in detail later with reference to FIG. 6.

Figure 4:
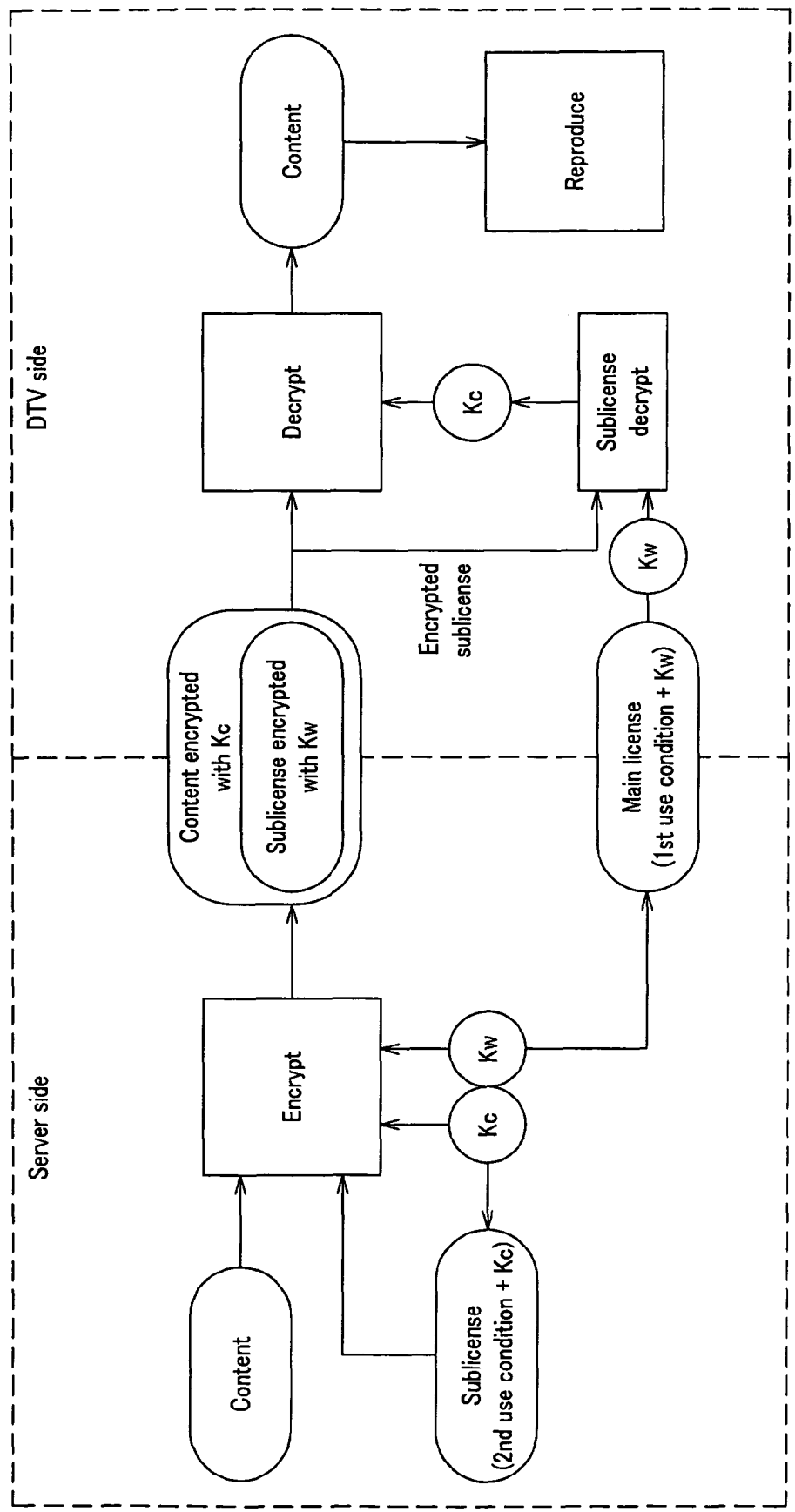

FIG. 4 schematically illustrates the delivery of a content and license in case the two-step licensing is applied.

The content resource file as the main element of the content is encrypted with the content key Kc by the content server 75, and supplied along with sublicense encrypted with the work key Kw to the DTV 2. It should be noted here that the sublicense includes a second use condition under which a corresponding content is used and a content key Kc for decrypting a corresponding encrypted content.

The work key Kw for decryption of the encrypted sublicense is included in a main license which is in one-to-one correspondence with the subscription contract. The main license is supplied from the DRM server 74 to the DTV 2 separately from the content. The main license includes, in addition to the work key Kw, a first use condition under which a content corresponding to the subscription contract is used.

In the DTV 2, the encrypted sublicense is decrypted with the work key Kw included in the main license, and the encrypted content is decrypted for reproduction with the content key Kc. It should be noted that delivering a content and license in case the two-step licensing is applied will be described in detail later with reference to FIG. 8.

Figure 5:
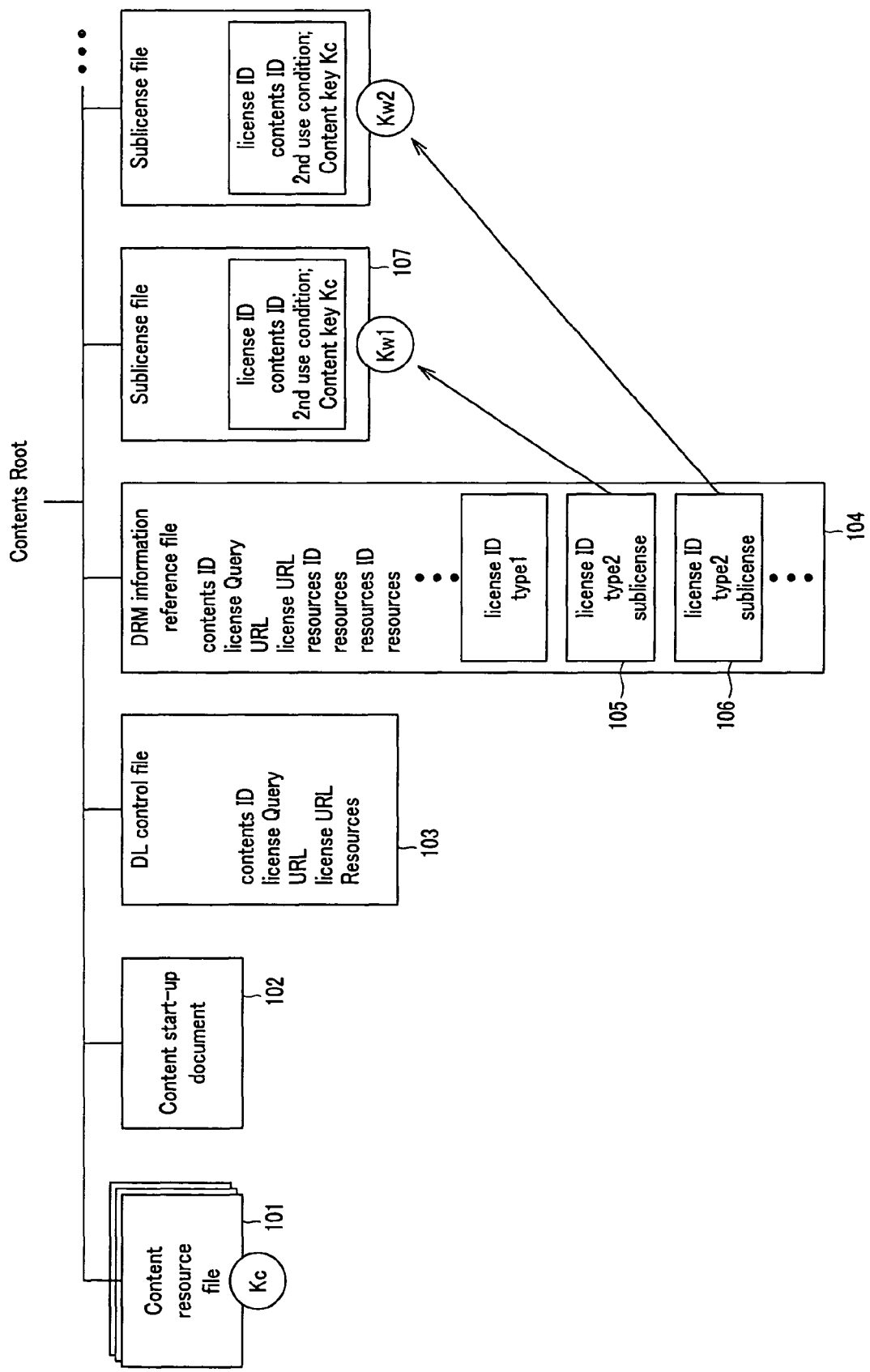
FIG. 5 shows an example of the content configuration.

FIG. 5 shows an element included in one content. As shown, one content includes a content resource file 101 including more than one file, content start-up document 102, downloading control file 103, DRM information reference file 104, and a sublicense file 107. It should be noted that for delivering the content only under the PPC contract, the sublicense file 107 may not be included as an element of the content.

The content resource file 101 is a main element of the content. It is AV data conforming to a format such as the MPEG-2 or the like, and has been encrypted with the content key Kc. The content start-up document 102 is used for transition to the reproduction of the content resource file 101, and it is first executed for starting up the content. The corresponding DRM information reference file 104 is specified in the corresponding content start-up document 102.

The downloading control file 103 is referred to for downloading the content. It includes information for downloading, such as "content ID" which is information for identification of a content, "license Query URL (uniform resource locator)" which is information indicative of a destination of which an inquiry is to be made for the license, "license URL" which is information indicative of a destination from which the main license is to be acquired, and "Resources" which is information including a resource and resource ID for identification of a content resource file included in the content.

The DRM information reference file 104 includes a list of licenses necessary for DRM operations related with the content such as decryption of an encrypted content resource file and the like in addition to "content ID", "license Query URL", "license URL", "resource" and "resource ID". The information on each of the licenses includes "license ID" which is information for identification of a license, type information indicative of whether there exists a sublicense, and "sublicense" indicative of the name of a sublicense which exists as indicated by the type information.

In case "type 1" is stated in the type information indicative of whether there exists the sublicense, it means that the one-step licensing is applied to the license, there exists no sublicense and a corresponding content resource file can be decrypted only under that license.

In case "type 2" is stated in the type information indicative of whether there exists the sublicense, it means that the two-step licensing is applied to the license and there exists a sublicense.

A sublicense includes "license ID" which is information for identification of a license, "content ID" which is information for identification of a content, second use condition for using the content, and content key Kc used for decryption of an encrypted content resource file. It is encrypted with a work key Kw. The work key Kw is included in a main license managed by the DRM server 74 separately from a content including the content resource file 101 to sublicense file 107.

Note that in case a content is to be delivered as MPEG2-TS by multicasting, the sublicense 107 is stored in the ECM section of the MPEG2-TS (will be described in detail later).

Figure 6:
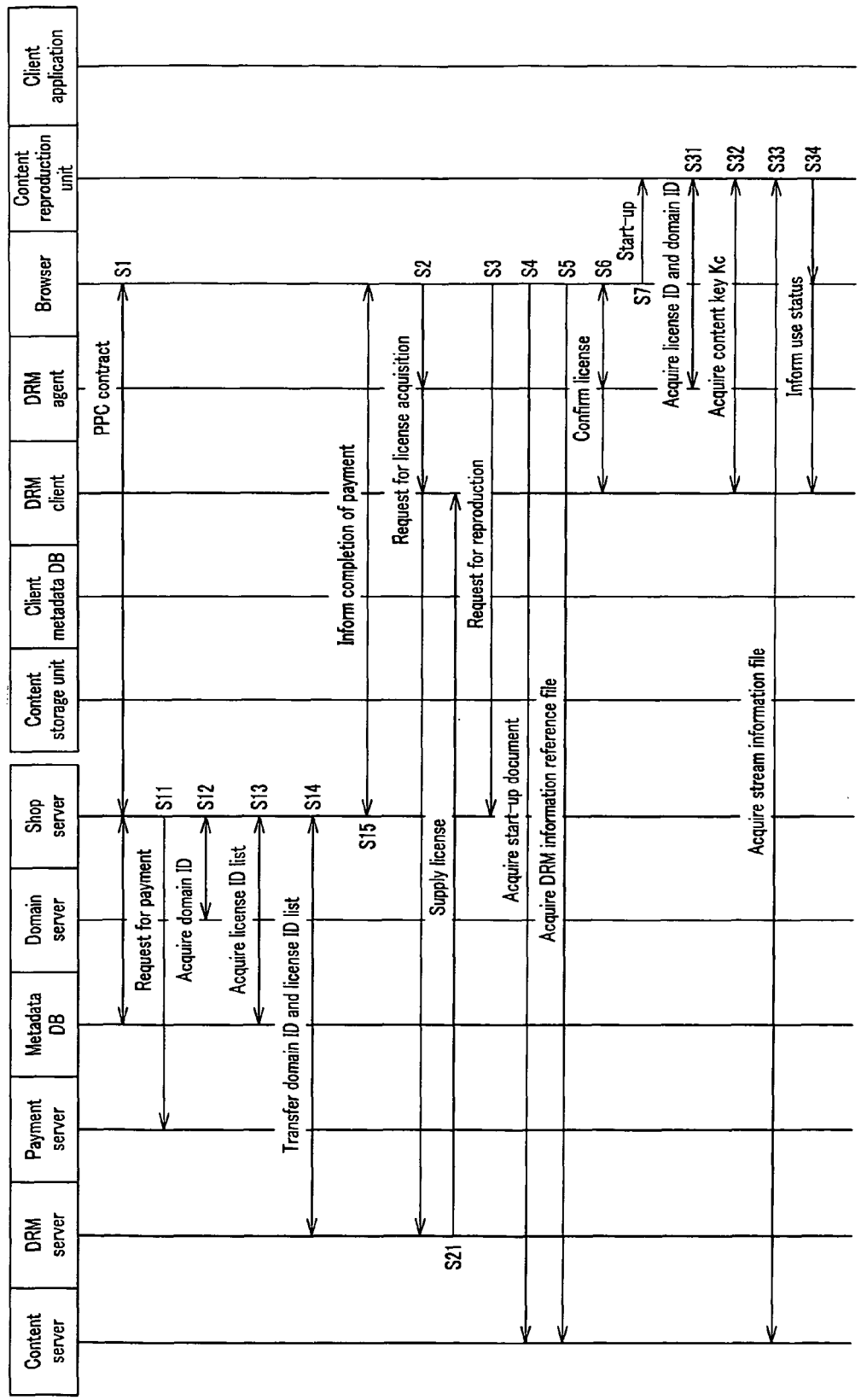
FIG. 6 is a timing diagram showing a sequence of operations made in delivering a content to be sold under PPC contract and a one-step license corresponding to the PPC contract.

Next, a series of operations for delivering a content to be sold under the PPC contract and a one-step license corresponding to the content will be explained with reference to the timing diagram in FIG. 6. It should be noted that it is assumed here that the user of the DTV 2 has made basic user registration to the server 3, is issued with a user ID and domain ID and has already informed payment information such as his or her credit card number, depositor account number or the like.

In step S1, the browser 23 in the DTV 2 accesses, in response to a user's operation, the shop server 71 for buying a content under the PCC contract, and presents, on the presentation unit 22, a list of contents the user can buy on the basis of navigation information supplied from the shop server 71. When the user selects a desired content (will also be referred to as "package" as a unit of buying hereunder) from the list of contents being presented, the browser 23 will send, to the shop server 71, registration information for buying the package under the PPC contract (information for identifying the user (user ID), information for identifying the package the user is going to buy (package ID), etc. Correspondingly, the shop server 71 connects to the payment server 72, and informs the latter of the user ID and package ID sent from the browser 23 for requesting the payment server 72 to make a payment under the PPC contract in step S11.

After having received, from the payment server 72, the information that the payment has normally be done, the shop server 71 informs the domain server 76 of the user ID, and acquires the domain ID the domain server 76 has pre-issued correspondingly to the user ID, in step S12. That is, the shop server 71 acquires identification information which is to be supplied to a set of terminal units such as DTV 2 between which a license given to the user is allowed to transfer.

In step S13, the shop server 71 connects to the metadata DB 73, informs the latter of the package ID informed from the browser 23, and acquires a list of license IDs corresponding to a packet identified with the package ID (list of license IDs for necessary licenses for using a content of the package in question). In this case, the license IDs list includes license IDs for the one-step licenses.

In step S14, the shop server 71 transfers the acquired domain ID and list of license IDs to the DRM server 74. Correspondingly, the DRM server 47 stores the received domain ID and license IDs list in such a manner that they are in correspondence with each other. In step S15, the shop server 71 informs the browser 23 of information including necessary information for the browser 23 of the DTV 2 to acquire a package information file and which indicates that registration of the PPC contract has been completed. In response to this information, the browser 23 will inform the user that the PPC contract registration and payment are complete while connecting to the shop server 71 for acquiring a package information file.

Figure 7:
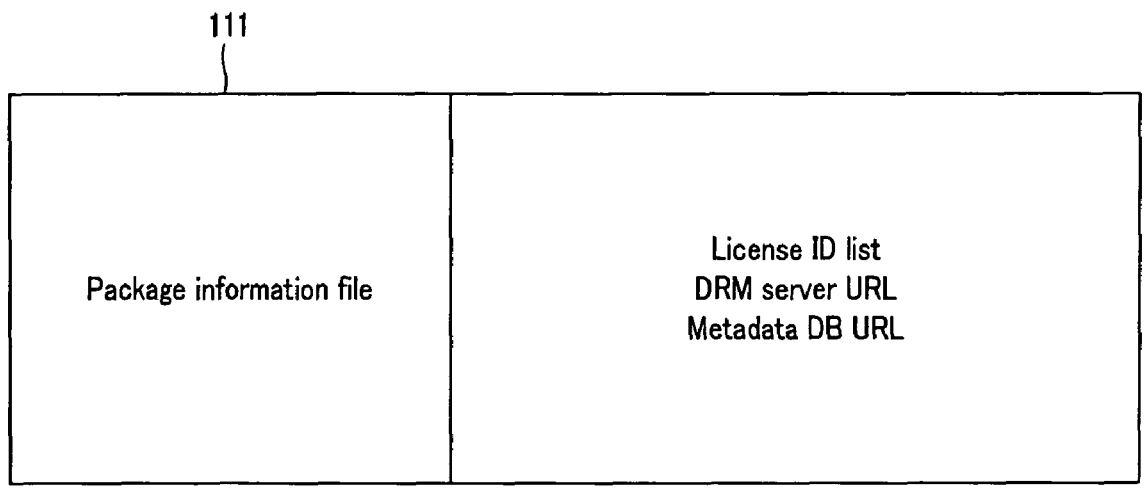
FIG. 7 shows an example of information included in a package information file.

FIG. 7 shows the configuration of the package information file the browser 23 has acquired from the shop server 71. The package information file 111 includes a license IDs list corresponding to the package under the PPC contract, URL in the DRM server 74 as a destination from which the license is to be acquired, and URL in the metadata DB 73 as a destination from which the metadata is to be acquired.

The description will be continued again with reference to FIG. 6. In step S2, the browser 23 having acquired the package information file starts up the package information processing agent 31 as a helper application. The package information processing agent 31 informs the DRM client 26 of the list of license IDs and URL in the DRM server 74 included in the acquired package information file, and a domain ID corresponding to the user via the DRM agent 25, and requests the DRM client 26 to acquire a license. In response to this request, the DRM client 26 will connect to the DRM server 74, send the license IDs list and domain ID to the DRM server 74, and request the DRM server 74 to acquire a license included in the license IDs list.

In step S21, the DRM server 74 judges, in response to the request, whether the supplied domain ID has normally been issued to the DTV 2 which is the sender and the licenses included in the supplied license IDs list are allowed to be supplied for the supplied domain ID. In case both these conditions are met, the DRM server 74 determines that the request from the DRM client 26 is appropriate, and supplies a license included in the license IDs list to the DRM client 26. The DRM client 26 stores the supplied license securely, and informs the DRM agent 25 that the acquirement of the license is complete. At this stage, the license for the content bought under the PPC contract will have been acquired.

Thereafter, to reproduce the content bought under the PPC contract in response to a user's operation, the browser 23 accesses, in step S3, the shop server 71 for reproduction of the content already bought under the PPC contract, and presents, on the presentation unit 22, a list of contents already bought under the PPC contract and which are reproducible on the basis of navigation information supplied from the shop server 71. In case the user has selected a desired content from the list presented on the presentation unit 22, the browser 23 accesses, in step S4, the content server 75 to acquire the content start-up document 102 included in the selected content, and has a plug-in execute the content start-up document 102. Also, the browser 23 stores, along with the content start-up document 102, URL in the shop server 71 to which access has been designated upon completion of the content reproduction.

In step S5, the plug-in of the browser 23 acquires a DRM information reference file 104 specified with the content start-up document 102 from the content server 75.

In step S6, the browser 23 starts up the DRM agent 25 as a helper application and has the latter analyze the acquired DRM information reference file 104. The DRM agent 25 informs the DRM client 26 of content IDs stated in the DRM information reference file 104, and checks that the DRM client 26 holds licenses corresponding to the content IDs. In case the DRM client 26 holds only one corresponding license, the license will be used. In case the DRM client 26 holds a plurality of corresponding licenses, the licenses will be presented to the user who will select a desired one of the licenses.

After a desired license is selected, the DRM client 26 will read information on the license from the DRM information reference file 104, and then reads type information from the read information. In case the type information indicates "type 1", the license having been confirmed to be held in the DRM client 26 is a one-step license type one, and so the encrypted content resource file 101 will be decrypted with only the license having been confirmed to be held in the DRM client 26. In case the type information indicates "type 2", the license having been confirmed to be held in the DRM client 26 is a two-step license type one, and so a corresponding sublicense will be acquired to decrypt the encrypted content resource file 101. In this example, since the type information indicates "type 1", no sublicense will be acquired. The DRM client 26 sends the license ID for the corresponding license back to the DRM agent 25. The DRM agent 25 will exit its own operation with storage of the sent-back license ID.

In response to the fact that the stream-type content resource file 101 is stated in the DRM information reference file 104, the browser 23 starts up, instep S7, the content reproduction unit 24 without waiting for the operation of the DRM agent 25.

In step S31, the content reproduction unit 24 recognizes, based on the extension of the content name in the stream-type content resource file to be reproduced, that the content resource is encrypted, and confirms that the DRM agent 25 has already acquired a license. When the content reproduction unit 24 has confirmed that the DRM agent 25 has acquired the license, it will acquire a corresponding license ID and domain ID. It should be noted that if the content reproduction unit 24 has not yet confirmed at this stage whether the DRM agent 25 has acquired a license, it will wait until it confirms that the DRM agent 25 has acquired the license.

In step S32, the content reproduction unit 24 informs the DRM client 26 of the license ID and domain ID, and requests the DRM client 26 to supply a license. If the use condition included in the license is met at this time point, the DRM client 26 securely transfers the content key Kc and use condition included in the license to the content reproduction unit 24. The content reproduction unit 24 sets the content key Kc in its internal decryption unit (not shown) and starts applying the use condition.

In step S33, the content reproduction unit 24 acquires a stream information file from the content server 75, then decrypts encrypted content resources acquired one after another by streaming delivery to decode the stream information file, and presents an image and sound on the presentation unit 22.

Then, when the content has been reproduced to the end, the reproduction has been aborted in response to a command from the user or when the use condition has become not met in the course of the reproduction, the content reproduction unit 24 informs the DRM client 26 of the use state and end of the reproduction at such a time in step S34.

Thereafter, the content reproduction unit 24 exits its own operation. The browser 23 will access URL (uniform resource locator) of the shop server 71, held in the operation in step S4 and which it has been instructed to access at the end of content reproduction, and presents information obtained from the URL in the presentation unit 22. Thus, the server 3 can present, to the user having made test-listen to a content under the PPC contract, intended information such as advertisement or the like of a sequel of the content to which the user has made the test-listen.

The series of operations for delivering a content sold under the PCC contract and a one-step license for the content has been described.

Figure 8:
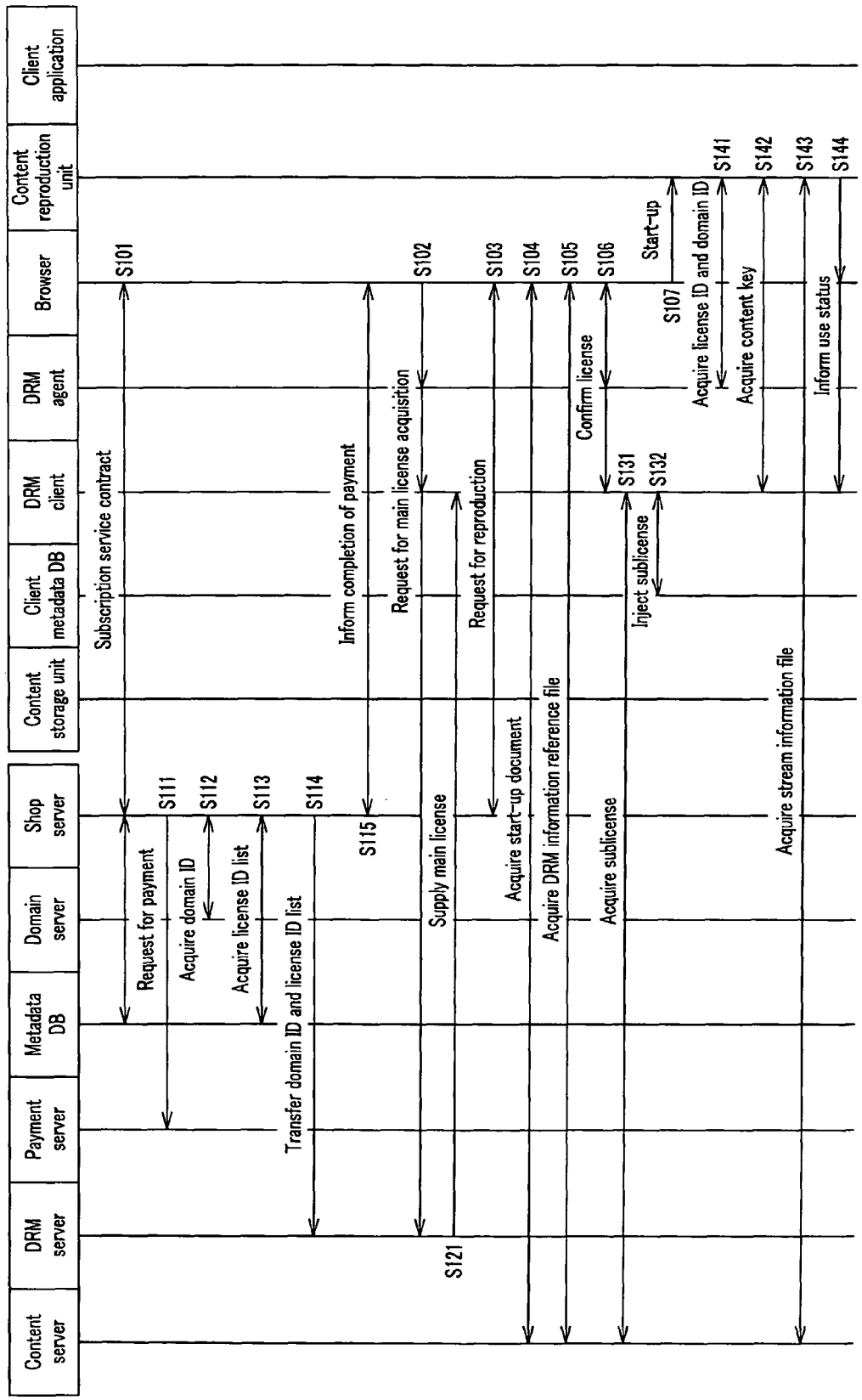
FIG. 8 is a timing diagram showing a series of operations made in delivering a content to be sold under a subscription contract and two-step license (main and sub licenses).

Next, a series of operations for the delivering a content to be sold under the subscription contract and a two-step license for the content will be explained with reference to the timing diagram in FIG. 8. It should be noted that it is assumed here that the user of the DTV 2 has made basic user registration to the server 3, is issued with a user ID and domain ID and has already informed payment information such as his or her credit card number, depositor account number or the like.

In step S101, the browser 23 in the DTV 2 accesses, in response to a user's operation, the shop server 71 for making a subscription contract on a channel or the like on which a content such as a drama series which is broadcast in every morning, and presents, on the presentation unit 22, a list of channels or the like on which the user can make a subscription contract on the basis of navigation information supplied from the shop server 71. When the user selects a desired channel (will also be referred to as "package" as a unit of buying hereunder) for which he or she is going to make a subscription contract, the browser 23 will send registration information for making a subscription contract for the selected channel to the shop server 71. It should be noted that the registration information includes information for identifying the user (user ID), information for identifying a package for which a subscription contract is to be made (package ID), etc. Correspondingly, the shop server 71 connects to the payment server 72, and informs the latter of the user ID and package ID sent from the browser 23 for requesting the payment server 72 to make a payment under the subscription contract in step S111.

After having received, from the payment server 72, the information that the payment has normally be done, the shop server 71 informs the domain server 76 of the user ID, and acquires the domain ID the domain server 76 has pre-issued in response to the user ID, in step S112.

In step S113, the shop server 71 connects to the metadata DB 73, informs the latter of the package ID informed from the browser 23, and acquires a list of license IDs corresponding to a packet identified with the package ID. In this case, the license IDs list includes license IDs for the two-step licenses.

In step S114, the shop server 71 transfers the acquired domain ID and list of license IDs to the DRM server 74. Correspondingly, the DRM server 74 stores the received domain ID and license IDs list in such a manner that they are in correspondence with each other. In step S115, the shop server 71 informs the browser 23 of information including necessary information for the browser 23 of the DTV 2 to acquire a package information file and which indicates that registration of the subscription contract is over. In response to this information, the browser 23 will inform the user that the subscription contract registration and payment are over while connecting to the shop server 71 for acquiring a package information file.

The package information file the browser 23 acquired from the shop server 71 is configured similarly to that shown in FIG. 7, and includes a license IDs list corresponding to the package under the subscription contract, URL in the DRM server 74 as a destination from which the license is to be acquired, and URL in the metadata DB 73 as a destination from which the metadata is to be acquired.

In step S102, the browser 23 having acquired the package information file starts up the package information processing agent 31 as a helper application. The package information processing agent 31 informs the DRM client 26 of the list of license IDs and URL in the DRM server 74 included in the acquired package information file, and a domain ID corresponding to the user via the DRM agent 25, and requests the DRM client 26 to acquire a license. In response to this request, the DRM client 26 will connect to the DRM server 74, send the license IDs list and domain ID to the DRM server 74, and request the DRM server 74 to acquire a license included in the license IDs list.

In step S121, the DRM server 74 judges, in response to the request, whether the supplied domain ID has normally been issued to the DTV 2 which is the sender and the license included in the supplied license IDs list is allowed to be supplied for the supplied domain ID. In case both these conditions are met, the DRM server 74 determines that the request from the DRM client 26 is appropriate, and supplies a license included in the license IDs list to the DRM client 26. The DRM client 26 stores the supplied license securely, and informs the DRM agent 25 that the acquirement of the license is over. At this stage, acquisition of the main license of the necessary main license and sublicense for use of the content bought under the subscription contract will be complete.

Thereafter, to reproduce the content bought under the subscription contract in response to a user's operation, the browser 23 accesses, in step S103, the shop server 71 for reproduction of the content already bought under the subscription contract, and presents, on the presentation unit 22, a list of contents already bought under the subscription contract and which are reproducible on the basis of navigation information supplied from the shop server 71. In case the user has selected a desired content from the list presented on the presentation unit 22, the browser 23 accesses, in step S104, the content server 75 to acquire the content start-up document 102 included in the selected content, and has a plug-in execute the content start-up document 102. Also, the browser 23 stores, along with the content startup document 102, URL in the shop server 71 to which access has been designed upon completion of the content reproduction.

In step S105, the plug-in of the browser 23 acquires a DRM information reference file 104 specified with the content start-up document 102 from the content server 75.

In step S106, the browser 23 starts up the DRM agent 25 as a helper application and has the latter analyze the acquired DRM information reference file 104. The DRM agent 25 informs the DRM client 26 of content IDs included in the DRM information reference file 104 one by one, and checks whether the DRM client 26 holds licenses corresponding to the content IDs. In case the DRM client 26 holds only one of corresponding licenses, the license will be used. In case the DRM client 26 holds a plurality of corresponding licenses, the licenses will be presented to the user who will select a desired one of the licenses. After the user selects the desired license, the DRM client 26 will read information on the license from the DRM information reference file 104, and read type information from that license information.

In the above case, explanation will be continued on the assumption that the type information indicates "type 2". In step S131, the DRM agent 25 knows the name of a corresponding sublicense by referring to the DRM information reference file 104, and accesses the content server 75 to acquire the sublicense having the sublicense name. In step S132, the DRM agent 25 injects the acquired sublicense into the DRM client 26. The DRM client 26 stores the injected sublicense in correspondence with the already acquired main license. The DRM agent 25 will exit its own operation with holding the license ID and content ID.

In response to the fact that the stream-type content resource file 101 is stated in the DRM information reference file 104, the browser 23 starts up, in step S107, the content reproduction unit 24 without waiting until the license ID from the DRM client 26 is held in the DRM agent 25.

In step S141, the content reproduction unit 24 recognizes, based on the extension of the content name in the stream-type content resource file to be reproduced, that the content resource is encrypted, and confirms that the DRM agent 25 has already acquired a license. When the content reproduction unit 24 has confirmed that the DRM agent 25 has acquired the license, it acquires a corresponding license ID and domain ID. It should be noted that if the content reproduction unit 24 has not yet confirmed at this stage whether the DRM agent 25 has acquired a license, it will wait until it confirms that the DRM agent 25 has acquired the license.

In step S142, the content reproduction unit 24 informs the DRM client 26 of the license ID and domain ID, and requests the DRM client 26 to supply a content key Kc. The DRM client 26 decrypts the encrypted sublicense using the work key Kw included in the main license, and if the use condition included in the license is found met at this time point, the DRM client 26 securely transfers the content key Kc and use condition included in the license to the content reproduction unit 24. The content reproduction unit 24 sets the content key Kc in its internal decryption unit, and starts applying the use condition.

In step S143, the content reproduction unit 24 acquires a stream information file from the content server 75, then decrypts encrypted content resources acquired one after another by streaming delivery, and starts presentation of an image and sound on the presentation unit 22.

Then, when the content has been reproduced to the end, the reproduction has been aborted in response to a command from the user or when the use condition has become not met in the course of the reproduction, the content reproduction unit 24 informs the DRM client 26 of the use state and end of the reproduction at such a time in step S144.

Thereafter, the content reproduction unit 24 exits its own operation. The browser 23 will access URL in the shop server 71, held in the operation in step S104 and which it has been instructed to access at the end of content reproduction, and presents information obtained from the URL in the presentation unit 22. Thus, the server 3 can present, to the user having made test-listen to a content under the subscription contract, intended information such as advertisement or the like of a sequel of the content to which the user has made the test-listen.

Delivering the content sold under the subscription contract and two-step license for the content have been described.

As having been described above, since the server 3 sends the DRM information reference file 104 including type information indicating which of the one-step land two-step licenses is adopted for licensing a content in consideration, and the DTV 2 makes different operations for different types, respectively, indicated by the type information, it is possible to efficiently implement a content delivery service in which both the PPC and subscription contracts are used.

Note that the type information indicating which of the one-step and two-step license is adopted for licensing a content may be included in metadata corresponding to each package, for example, in license metadata, for sending and the DTV 2 may be adapted to make an operation corresponding to the type of licensing by referring to the type information when it is given a command for reproduction of the content.

Next, there will explained implementation of a pay-per-view with preview (will be referred to as "PPV/preview" hereunder) of a content delivered, by streaming, from the server 3 to a plurality of DTV 2. Note that a content delivered under a license for PPV/preview (PPV/preview license) will be referred to as "PPV/preview content" hereunder.

A content broadcast from the server 3 conforms to the MPEG2-TS format. The two-step licensing is applied to the license for reproduction of the content having the MPEG2-TS format, and a sublicense for preview (test listen/-view before buying of a content is decided) permitted for a predetermined time of the total time of reproduction of a content, for example, for a few minutes from the top of the content, and a sublicense for full-scale listen/view, permitted after the buying of the content is decided, of the content for the total time of reproduction, are included in the contents having the MPEG2-TS format before being delivered. In the DTV 2, a main license for a PPV/preview channel or the like is acquired in advance. When the content is delivered by multicasting, the sublicense for the preview is first used. After deciding to buy the content, the sublicense for the full-scale listen/view is to be used.

The preview license and full-scale listen/view license are stored in an ECM (entitlement control message) section of the MPEG2-TS for delivery.

FIG. 9 shows an example of the ECM section in which there are stored the preview sublicense and full-scale listen/view sublicense. The ECM section includes an ECM section header having stored therein identification information indicating that the packet is an ECM section, ECM body and an error-correction CRC (cyclic redundancy check) section. The ECM body includes a header having various kinds of information stored therein, and a license section having sublicenses stored therein.

The ECM body includes protocol number information for identification of a protocol, business entity identification information for identification of a business entity one from another, work key identification information for identification of a work key Kw included in a main license, content ID for identification of a content corresponding to the ECM section, odd/even information on a content to be listened to and viewed, indicating with which one of the odd and even content keys a current content being listened to and viewed can be decrypted, information on the number of sublicenses (for a program being delivered) indicative of the number (=n) set in a content being currently delivered, information on the $\underline{n}$ sublicenses corresponding to the content being currently delivered, information on the number of sublicenses (for a next program to be delivered) indicative of the number (=n) of sublicenses set in the next content to be delivered, and information on the $\underline{n}$ sublicenses corresponding to the next content to be delivered.

The information on each of the sublicenses includes a license ID as sublicense identification information and a location where the sublicense is stored in the license section (number of bytes counted from the top of the ECM body).

In the above sublicense information, the sublicense for preview, and sublicense for full-scale listen/view, with respect to the same content are assigned the same license ID and different in type information and location from each other.

Note that in case the preview and full-scale listen/view sublicenses are stored in the ECM section, the packet ID for ECM session will be included in a limited-reception extension (CA extension) in PMT (program map table) in the MPEG2-TS.

The preview sublicense includes a use condition for preview (such as length of previewing time etc.) and content key Kc. The full-scale listen/view sublicense includes use conditions for the full-scale listen/view and content key Kc.

Note that by changing the use condition for preview, temporal location of preview and length of previewing time in the total length of content reproduction time can be set to a few minutes from the top of the content and also can freely be set. Also, since a different preview sublicense can be stored in the ECM section, the server 3 can provide a plurality of chances of preview in the total length of content reproduction time. Further, the preview sublicense may be delivered for only a period of the total length of content reproduction for which the preview is permitted.

Figure 10:
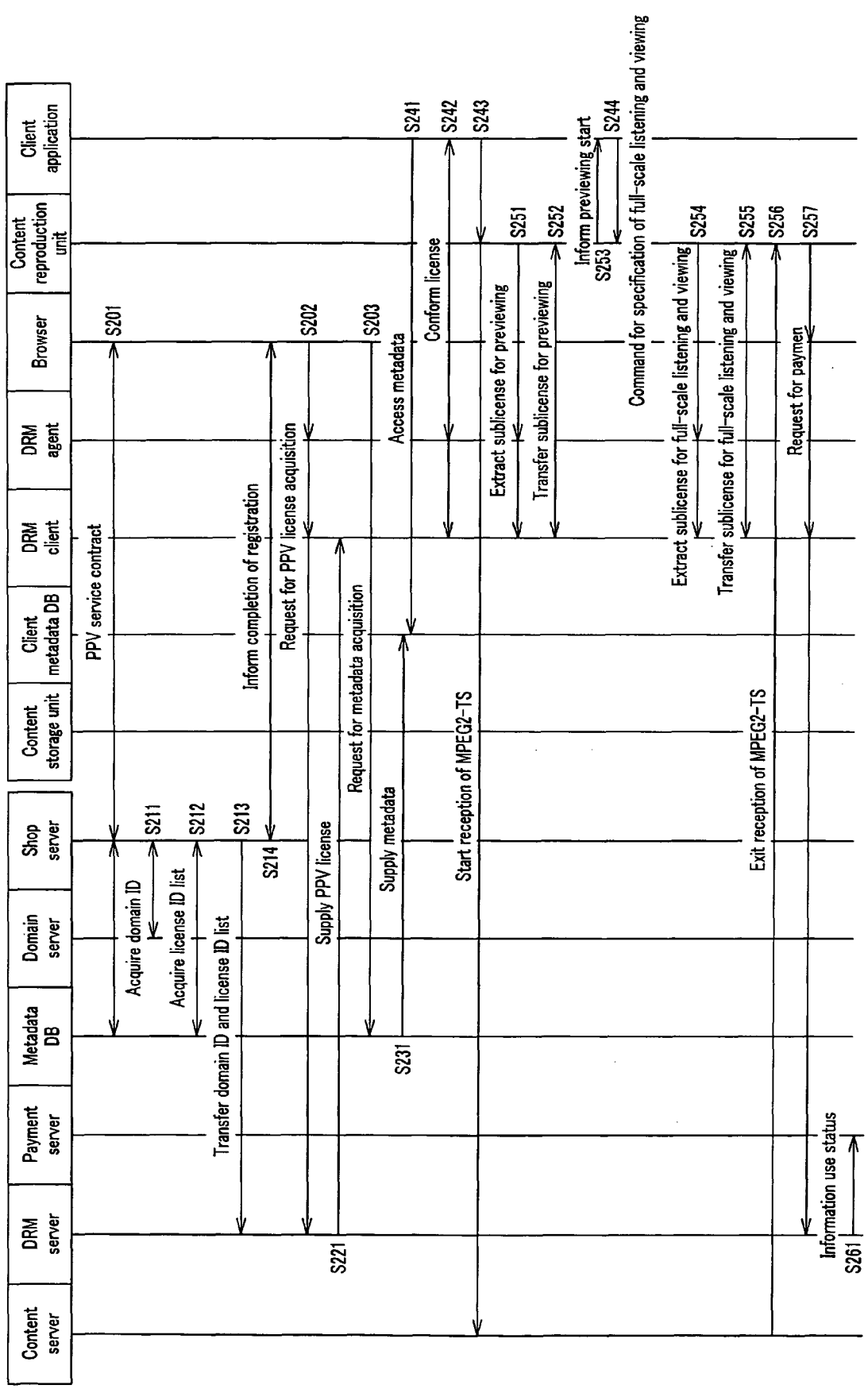
FIG. 10 is a timing drawing showing a sequence of operations made in multicasting delivery of a content which is sold under a license for a pay-per-view (PPV) with preview.

Next, a series of operations for multicasting delivery of a PPV/preview content from the server 3 to more than one DTV 2, will be explained with reference to the timing diagram in FIG. 10. It should be noted that it is assumed here that the user of the DTV 2 has made basic user registration to the server 3, is issued with a user ID and domain ID and has already informed payment information such as his or her credit card number, depositor account number or the like.

In step S201, the browser 23 in the DTV 2 accesses, in response to a user's operation, the shop server 71 for making a subscription contract for reception of channels on which a PPV/preview content is broadcast, and presents, on the presentation unit 22, a list of channels the user can get on the basis of navigation information supplied from the shop server 71. When the user selects a desired content (will also be referred to as "package" as a unit of buying hereunder) from the list of channels thus presented, the browser 23 will send registration information for the subscription contract for the channels back to the shop server 71. It should be noted that the registration information includes information for identification of the user (user ID) and information for identification of the package the user is going to buy (package ID).

In step S211, the shop server 71 informs the domain server 76 of the user ID, and acquires the domain ID the domain server 76 has pre-issued in response to the user ID.

In step S212, the shop server 71 connects to the metadata DB 73, informs the latter of the package ID informed from the browser 23, and acquires a list of license IDs corresponding to a package identified with the package ID. In this case, the license IDs list includes license IDs for the two-step licenses for channels on which a PPV/preview content can be delivered.

In step S213, the shop server 71 transfers the acquired domain ID and license IDs list to the DRM server 74. Correspondingly, the DRM server 74 stores the received domain ID and license IDs list in correspondence with each other. In step S214, the shop server 71 informs the browser 23 of information including necessary information for the browser 23 of the DTV 2 to acquire a package information file and that indicates that registration of the subscription contract is over. In response to this information, the browser 23 will present the user that the registration of subscription contract and payment are complete, and connects to the shop server 71 to acquire a package information file.

The package information file the browser 23 acquired from the ship server 71 includes a license IDs list corresponding to the package under the subscription contract, URL in the DRM server 74 as a destination from which the license is to be acquired, and URL in the metadata DB 73 as a destination from which the metadata is to be acquired.

In step S202, the browser 23 having acquired the package information file starts up the package information processing agent 31 as a helper application. The package information processing agent 31 informs the DRM client 26 of the license IDs list and URL in the DRM server 74, included in the acquired package information file, and a domain ID corresponding to the user via the DRM agent 25, and requests the DRM client 26 to acquire a main license for channels on which a PPV/preview content can be delivered (will be referred to as "PPV license" hereunder). In response to this request, the DRM client 26 will connect to the DRM server 74, send the license IDs list and domain ID to the DRM server 74, and request the DRM server 74 to acquire the PPV license corresponding to the license ID.

In step S221, the DRM server 74 judges, in response to the request, whether the supplied domain ID has normally been issued to the DTV 2 which is the sender and the PPV license corresponding to the supplied license IDs list is allowed to be supplied for the supplied domain ID. In case both these conditions are met, the DRM server 74 determines that the request from the DRM client 26 is appropriate, and supplies a PPV license corresponding to the license ID to the DRM client 26. The DRM client 26 stores the supplied PPV license securely, and informs the DRM agent 25 that the acquirement of the PPV license is complete. At this stage, of the necessary PPV license and sublicense for use of the content broadcast on the channels which can deliver PPV/preview content and bought under the subscription contract, the PPV license will be completely acquired.

In step S203, the package information processing agent 31 connects to the metadata DB 73 on the basis of URL in the metadata DB 73 included in the acquired package information file, and requests the metadata DB 73 to acquisition of package metadata corresponding to the bought package. It should be noted that the package includes the right to receive a channel on which a PPV/preview content can be broadcast.

In step S231, the metadata DB 73 supplies, in response to the request, requested package metadata to the client metadata DB 29 in which the metadata will be held. After completion of the above operations, the package information processing agent 31 exits its own operation. Thereafter, the client application 28 periodically acquires, from the metadata DB 73, content metadata corresponding to the content broadcast on the channels corresponding to the bought package, and the content metadata is held in the client metadata DB 29.

Thereafter, for listening to and viewing a content broadcast on a channel under the subscription contract, the user starts up the client application 28. In step S241, the client application 28 will present the user a list of contents which can be listened to and viewed and are broadcast at this time by referring to the metadata held in the client metadata DB 29. When the user selects a content and gives a command for starting the listen/view of the content, the client application 28 goes to step S242 where it will refer to the metadata, inform the DRM client 26 of a license ID for the PPV license, URL in the DRM server 74 and domain ID via the DRM agent 25, and confirm that the PPV license has already been acquired, in step S242.

After confirming the acquisition of the PPV license, the client application 28 goes to step S243 where it will refer to the already acquired metadata corresponding to a user-selected content, acquire broadcasting URL in the content serer 75 (multicast address), specify a multicast address in the content server 75, and request the content reproduction unit 24 to reproduce the content. In response to this request, the content reproduction unit 24 connects to the specified multicast address where it will start reception of MPEG2-TS being broadcast.

In step S251, the content reproduction unit 24 extracts PATs (program association table) and PMTs one after another from the received MPEG2-TS, detects, based on the CA descriptor of the PMT, whether there exists an ECM session, and extracts the ECM session. The content reproduction unit 24 searches and extracts a preview sublicense by referring to type information among information on sublicense included in the header in the ECM body of the ECM session, and transfers the extracted preview sublicense to the DRM client 26 via the DRM agent 25. The DRM client 26 stores the supplied preview sublicense in correspondence with the already acquired PPV license.

In step 252, the content reproduction unit 24 informs the DRM client 26 of the license ID and domain ID for the preview sublicense, and requests the DRM client 26 to supply a correspondingly content key Kc. The DRM client 26 decrypts the encrypted preview sublicense with the work key Kw included in the PPV license. When the acquired use condition is met at this time, the DRM client 26 transfers the content key Kc and preview use condition included in the license securely to the content reproduction unit 24. The content reproduction unit 24 sets the content key Kc in its internal decryption unit, and starts application of the preview use condition. The preview user condition includes a period for which the preview is permitted, for example a time of X to Y minutes from the top of a content. The content reproduction unit 24 decrypts the MPEG2-TS to have the presentation unit 22 start presenting an image and sound. Thus, the content starts being previewed.

In step S253, the content reproduction unit 24 informs the client application 28 of the start of the preview. In response to this preview start, the client application 28 prompts the user to buy the previewed content for full-scale listen/view. In case the user buys the content in response to the prompt, the client application 28 instructs, in step S244, the content reproduction unit 24 to reproduce the content for full-scale listen/view.

In step S254, the content reproduction unit 24 searches and extracts a sublicense for the full-scale listen/view by referring to type information in sublicense information included in the header of the ECM body of the ECM session in the received MPEG2-TS, and transfers the extracted full-scale listen/view sublicense to the DRM client 26 via the DRM agent 25. The DRM client 26 stores the transferred full-scale listen/view sublicense in correspondence with the already acquired PPV license.

In step S255, the content reproduction unit 24 informs the DRM client 26 of the license ID and domain ID for the full-scale listen/view license, and requests the DRM client 26 to supply a corresponding content key Kc. The DRM client 26 decrypts the encrypted full-scale listen/view sublicense with a work key Kw included in the PPV license. If the acquired use condition is met at this stage, the DRM client 26 will securely transfer a content key Kc and full-scale listen/view use condition included in the license to the content reproduction unit 24. The content reproduction unit 24 sets the content key Kc in its internal decryption unit. The content reproduction unit 24 will continue content reproduction seamlessly without any delay unless the length of previewing time prescribed in the preview use condition has elapsed. On the contrary, if the length of previewing time prescribed in the preview use condition has elapsed, the content reproduction unit 24 will resume the content reproduction once stopped. When the reproduction is continued or resumed, the full-scale listen/view use condition starts being applied.

Note that the content key Kc used for preview may be the same as the content key Kc used for the full-scale listen/view and it may be used in common for the full-scale listen/view.

Thereafter, when the content has been reproduced to the end or when the user gives a command for stopping the reproduction, the content reproduction unit 24 stops the reception from a multicast address in the content server 75 in step S256. In step S257, the content reproduction unit 24 informs the DMR client 26 of the termination of the reproduction and use state of the present PPV. The DRM client 26 connects to the DRM server 74 and uploads the use state of the PPV to the DRM server 74. In response to this uploading, the DRM server 74 calculates an amount charged on the user for the service having been made on the basis of the state of PPV use, and requests the payment server 72 to pay the charged amount, in step S261.

Note that the payment may not be done at this stage but it may be done using the full-scale listen/view sublicense when the full-scale listen/view is started, for example.

Thereafter, the content reproduction unit 24 exits its own operation. The client application 28 will refer to metadata held in the client data DB 29 again, and present the user a list of contents which can be listened to and viewed at this stage and are to be broadcast. Here, the series of operations for multicasting delivery of PPV/preview content is complete.

As having been described above, the content delivery system according to the present invention can deliver a content by multicasting over the Internet with both the copyright protection and PPV with preview. It should be noted that the above-mentioned series of operations can be applied when a content is delivered on demand. For example, a portion of a content ranging from the top to a few minutes can be used for the purpose of promotion or the like.

In the foregoing, the application of the present invention to DTV has been explained. However, the present invention is also applicable to various types of content processing apparatuses including a video cassette recorder, TV tuner, hard disk recorder, DVD (digital versatile disk) recorder and others.

Also, the content delivery system according to the present invention can deliver TV broadcast programs as well as various other types of contents.

Note here that the aforementioned series of operations can be effected by hardware as well as software. In case the operations are to be done by software, a computer having a CPU (central processing unit) or the like installed in the DTV, for example, will carry out the software.

Also note that although the steps forming a program recorded in a recording medium according to the present invention can sequentially be performed time-serially as having been described in the foregoing, they may be performed in parallel or individually.

Also note that the content delivery system according to the present invention is a system including a plurality of devices.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A content delivery system including a server and a content processing apparatus, connected to each other across a network, wherein:

the server comprises:

a first license supplying means for supplying the content processing apparatus with a first license including a content key for a content in the content processing apparatus, the content key being used to encrypt the content;

a content supplying means for supplying the content processing apparatus with a series of data included in the content and which includes license identification information indicative of whether a sublicense, including the content key, exists for processing the content; and a sublicense supplying means for supplying the content processing apparatus with the sublicense for the content, wherein the sublicense is associated with a main license for a subscription contract for a content channel including multiple contents, the multiple contents including the content; and the content processing apparatus includes:

a judging means for judging, based on the license identification information included in the series of data supplied from the server, whether a sublicense exists for processing the content;

a license acquiring means for acquiring the sublicense based on the result of judgment from the judging means; and a data reproducing means for reproducing content resource data included in the series of data supplied from the content supplying means using the content key retrieved from at least one of the first license and the sublicense based on the result of judgment from the judging means.

2. The system according to claim 1, wherein the sublicense is a two-step license that is decrypted using a key in the main license.

3. The system according to claim 1, wherein the main license has a one-to-one correspondence with the subscription contract.

4. A content delivery method for a content delivery system including a server and content processing apparatus connected to each other across a network, the method comprising:

supplying the content processing apparatus with a first license including a content key for a content in the content processing apparatus, the content key being used to encrypt the content;

supplying the content processing apparatus with a series of data included in the content and including license identification information indicative of whether a sublicense, including a content key, exists for processing the content;

supplying a content processing apparatus with a sublicense for the content, wherein the sublicense is associated with a main license for a subscription contract for a content channel including multiple contents, the multiple contents including the content, judging based on the license identification information included in the series of data supplied from the server, whether a sublicense exists for processing the content;

acquiring the sublicense based on the judging result; and reproducing content resource data included in the series of data using the content key retrieved from at least one of the first license or the sublicense based on the judging result.

5. A content processing apparatus to process a content delivered from a server across a network, the apparatus comprising:

a first license acquiring means for acquiring a first license including a content key for encrypting a content;

a content acquiring means for acquiring a series of data included in the content;

a judging means for judging, based on license identification information included in the series of data acquired by the content acquiring means, whether a sublicense, including the content key, exists for the content, wherein the sublicense is associated with a main license for a subscription contract for a content channel including multiple contents, the multiple contents including the content;

a sublicense acquiring means for acquiring the sublicense based on the result of judgment from the judging means; and a data reproducing means for reproducing content resource data included in the series of data using the content key retrieved from at least one of the first license and the sublicense base on the result of judgment from the judging means.

6. The apparatus according to claim 5, wherein the sublicense is a two-step license that is decrypted using a key in the main license.

7. The apparatus according to claim 5, wherein when the judging means has determined that there is a sublicense for processing a content, the sublicense acquiring means acquires the sublicense from the series of data supplied from the server; and the reproducing means decrypts the encrypted sublicense on the basis of the first license and reproduces content resource data included in the series of data supplied by the content acquiring means on the basis of the decrypted sublicense.

8. The apparatus according to claim 5, wherein when the judging means has determined that there is not any sublicense for processing the content, the reproducing means reproduces content resource data included in the series of data acquired by the content acquiring means on the basis of the first license.

9. The apparatus according to claim 5, wherein the content acquiring means acquires first data included in a content corresponding to a reproduction starting operation made by the user, acquires second data including license identification information on the basis of the first data, and acquires content resource data on the basis of the first data.

10. The apparatus according to claim 5, further comprising a storage means for storing return-destination specifying information indicative of a destination specified by the server and to which the apparatus is to be connected after completion of content reproduction.

11. A content processing method of processing a content delivered from a server across a network, the method comprising:

acquiring, from the server across the network, a first license including a content key for encrypting a content;

acquiring a series of data included in the content;

judging, based on license identification information included in the series of data acquired in the content acquiring step, whether a sublicense, including the content key, exists for the content, wherein the sublicense is associated with a main license for a subscription contract for a content channel including multiple contents, the multiple contents including the content;

acquiring the sublicense based on the judging result; and reproducing content resource data included in the series of data acquired in the content acquiring step using at least one of the first license and the sublicense based on the judging result.

12. A non-transitory computer-readable medium, having recorded therein a computer-readable program, for causing a computer to execute a method for processing a content delivered from a server across a network, the method comprising:

acquiring a first license, including a content key for encrypting a content;

acquiring a series of data included in the content;

judging, based on license identification information included in the series of data acquired in the content acquiring step, whether a sublicense, including the content key, exists for the content, wherein the sublicense is associated with a main license for a subscription contract for a content channel including multiple contents, the multiple contents including the content;

acquiring the sublicense based on the judging result; and a data reproducing step of reproducing content resource data included in the series of data acquired in the content acquiring step using the content key retrieved from at least one of the first license or the sublicense based on the judging result.

13. A content supplying apparatus for supplying a content to a content processing apparatus across a network, the apparatus comprising:
- a first license supplying means for supplying a content processing apparatus with a first license including a content key for a content in the content processing apparatus, the content key being used to encrypt the content;
- a content supplying means for supplying the content processing apparatus with a series of data included in the content and which includes license identification information indicative of whether a sublicense, including the content key, exists for the content, wherein the sublicense is associated with a main license for a subscription contract for a content channel including multiple contents, the multiple contents including the content; and
- a sublicense supplying means for supplying the content processing apparatus with the sublicense for processing the content.

14. The apparatus according to claim 13, wherein the content requiring the first license and the sublicense for processing by the content processing apparatus is a content complying with the subscription contract, and the content requiring the first license, but not the second license, is a content complying with a pay-per-content contract.

15. The apparatus according to claim 13, wherein the sublicense is a two-step license that is decrypted using a key in the main license.

16. A content supplying method of supplying a content to a content processing apparatus across a network, the method comprising:
- supplying a content processing apparatus with a first license including a content key for a content in the content processing apparatus, wherein the content is encrypted with the content key;
- supplying the content processing apparatus with a series of data included in the content and which includes license identification information indicative, of whether a sublicense, including the content key, exists for the content, wherein the sublicense is associated with a main license for a subscription contract for a content channel including multiple contents, the multiple contents including the content; and
- supplying the content processing apparatus with the sublicense for processing the content.

17. A non-transitory computer-readable medium, having recorded therein a computer-readable program, for causing a computer to execute a method to process a content to be delivered from a server across a network, the method comprising:
- supplying a content processing apparatus with a first license including a content key for a content in the content processing apparatus, wherein the content is encrypted with the content key;
- supplying the content processing apparatus with a series of data included in the content and which includes license identification information indicative, of whether a sublicense, including the content key, exists for the content, wherein the sublicense is associated with a main license for a subscription contract for a content channel including multiple contents, the multiple contents including the content; and
- supplying the content processing apparatus with the sublicense for processing the content.

* * * * *